UNITED STATES PATENT OFFICE.

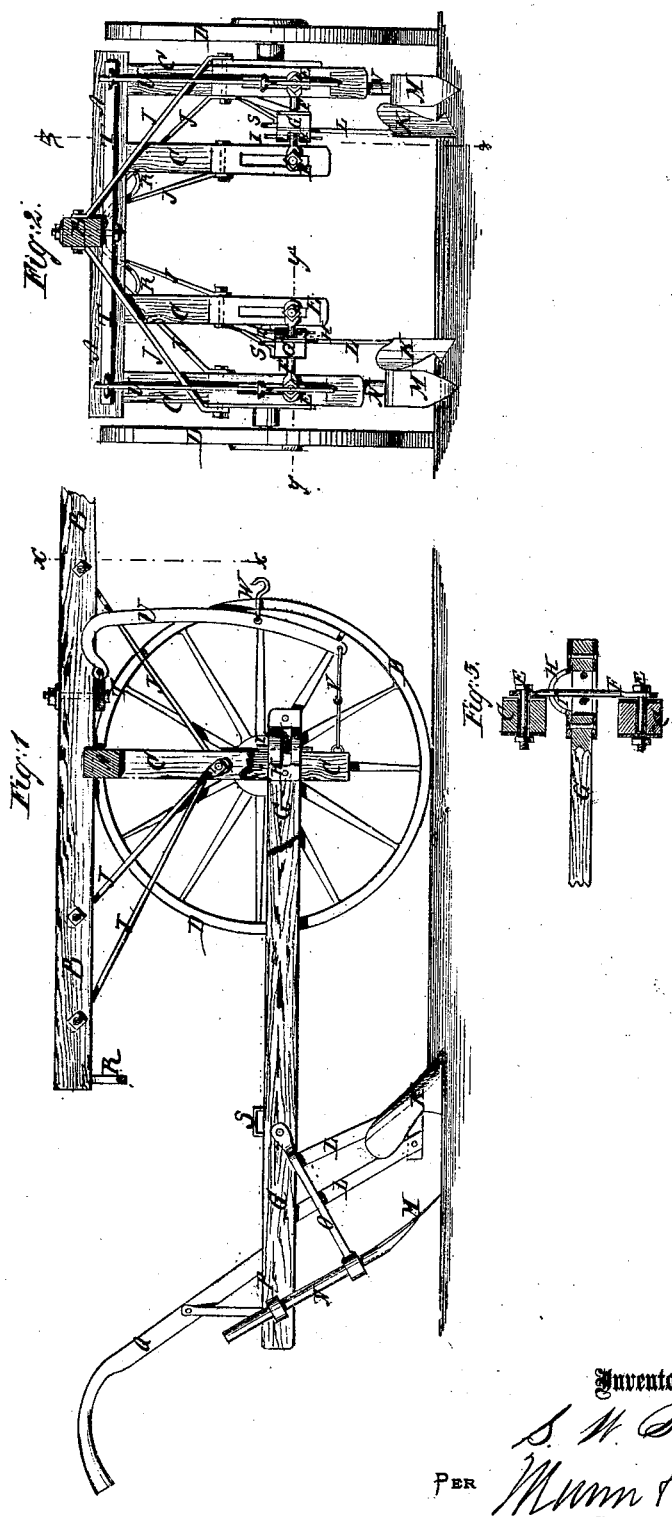

S. W. BROCK, OF NIANTIC, ILLINOIS.

IMPROVEMENT IN CULTIVATORS.

Specification forming part of Letters Patent No. 97,032, dated November 23, 1869.

*To all whom it may concern:*

Be it known that I, S. W. BROCK, of Niantic, in the county of Macon and State of Illinois, have invented a new and useful Improvement in Cultivators; and I do hereby declare that the following is a full, clear, and exact description thereof, whereby others skilled in the art can make and use the same, reference being had to the accompanying drawings, forming part of this specification.

Figure 1 is a side view of my improved cultivator, partly in section, through the line $z\,z$, Fig. 2, to show the construction. Fig. 2 is a front view of the same, partly in section, through the line $x\,x$, Fig. 1. Fig. 3 is a detail sectional view of the same, taken through the line $y\,y$, Fig. 2.

My invention has for its object to furnish an improved cultivator which shall be simple in construction, effective in operation, and easily adjusted to work closer to or farther from the plants, and to turn the soil toward or from the plants, as may be desired; and it consists in the construction and combination of various parts of the machine, as hereinafter more fully described.

A is a cross bar or beam, to which the tongue B is securely attached, and to which are also attached two pairs of downwardly-projecting arms or standards, C, a sufficient space being left between the inner standards C and beneath the middle part of cross-beam A for the passage of the plants being cultivated.

To the outer sides of the outer standards C are attached the short axles, upon which the wheels D revolve. The four standards C are slotted longitudinally in their lower parts, as shown in Fig. 2, to receive the bolts E, which pass through the ends of the bars F, so that by raising and lowering the said bolts E the said bars F may be raised and lowered. The bars F pass through slots in the forward ends of the plow-beams G. The longitudinal movement of the plow-beams G upon the bars F may be limited by pins or bolts passing through the slotted ends of the plow-beams G, as shown in Fig. 3.

H are curved or semicircular straps, which are slotted for the passage of the bars F, so as not to interfere with the lateral movement of the rear parts of the plow-beams.

The lateral movement of the forward end of the plow-beam G upon the bars F is limited by the pins or keys I, which pass through holes in the bars F, upon the inner or concave sides of the slotted straps H, as shown in Figs. 1, 2, and 3.

The curved straps H are detachable, so that they may be placed upon either side of the plow-beams, according as it is desired to have the plows work closer to or farther from the rows plants being cultivated.

The slotted standards C and the slotted plow-beams G may be strengthened and prevented from wearing by having slotted metallic plates attached to them, as shown in Fig. 3.

The standards C are strengthened by brace-rod J, the lower ends of which are attached to the said standard, and the upper ends of which are attached to the forward and rear part of the tongue B, as shown in Figs. 1 and 2.

K are two diamond-plows, each of which is made with two standards, L, the upper ends of which standards are securely but detachably bolted to the inner or outer sides of the beams G, according as it is desired to have the plows work closer together or farther apart; or, if desired, the said plows K L may be changed from one beam to the other, so as to turn the soil toward or from the plants, as may be desired.

M are shovel-plows, which are attached to the lower ends of the round standards N, which pass up through round eyes or holes formed in the rear ends of the brace-rods O, by which the draft-strain upon the plow-standards N is sustained, and the forward ends of which are bolted to the sides of the plow-beams G. The upper ends of the round standards N pass up through the eyes of the eye-bolts P, which pass through the rear ends of the beams G, and by which the said standards N are firmly held against the sides of the beams G, or against blocks interposed between the said standards and beams. By this construction the shovel-plows may be conveniently raised or lowered, as may be desired.

Q are the handles, one of which is secured to the rear part of each plow-beam, and which are so inclined that the operator may conveniently walk at the side of the row of plants being cultivated while guiding the plows.

It should be observed that the shovel and diamond plows may be used together or separately, as may be desired.

R are bars attached to the rear end of the tongue B and C, having hooks formed upon their lower ends, upon which may be hooked staples S, attached to the plow-beams G, to hold the plows away from the ground while passing from place to place.

T is the double-tree, which is connected with the tongue B in the ordinary manner. With the ends of the double-tree T are connected the upper ends of the draft-bars U, the lower ends of which are connected with the lower ends of the outer standards C by short chains or equivalent jointed connections V.

The draft-bars U are provided with hooks W, for the attachment of the whiffletrees or tugs of the team, as shown in Fig. 1.

Having thus described my invention, I claim as new and desire to secure by Letters Patent—

The curved slotted strap H, pin or key I, bar F, and adjustable bolts E, with each other and with the slotted plow-beams G and slotted standards C, attached to the cross-beam A, substantially as herein shown and described, and for the purpose set forth.

S. W. BROCK.

Witnesses:
    J. G. KIZER,
    J. P. FARIS.